US007092268B2

(12) United States Patent
George

(10) Patent No.: US 7,092,268 B2
(45) Date of Patent: Aug. 15, 2006

(54) ISOLATING POWER SUPPLY

(76) Inventor: Richard Warrington George, Frisby House, Church Road Castlemorton, Worcestershire (GB) WR13 6BE ( * ) Notice: Subject to any disclaimer, the term of this patent is extended or adjusted under 35 U.S.C. 154(b) by 0 days.

(21) Appl. No.: 10/615,235

(22) Filed: Jul. 9, 2003

(65) Prior Publication Data
US 2004/0008529 A1  Jan. 15, 2004

(30) Foreign Application Priority Data

Jul. 9, 2002 (GB) ................................. 0215814.5
Feb. 11, 2003 (GB) ................................. 0303012.9

(51) Int. Cl.
*H02M 7/06* (2006.01)
*H02M 5/42* (2006.01)
*H01F 17/00* (2006.01)

(52) U.S. Cl. ......................................... 363/126; 363/89
(58) Field of Classification Search .................. 363/84, 363/89, 123, 125, 126, 127
See application file for complete search history.

(56) References Cited

U.S. PATENT DOCUMENTS

| 3,699,426 A | 10/1972 | Bauman |
| 5,345,376 A | 9/1994 | Nourbakhsh |
| 5,548,463 A * | 8/1996 | Aldridge et al. ............. 361/18 |
| 5,726,875 A | 3/1998 | Hirabayashi et al. |
| 5,801,933 A | 9/1998 | Ravid |
| 5,977,658 A * | 11/1999 | Hoole .......................... 307/80 |
| 6,469,919 B1 * | 10/2002 | Bennett .................... 363/56.02 |
| 6,614,671 B1 * | 9/2003 | Thrap .......................... 363/67 |
| 6,650,553 B1 * | 11/2003 | Tsai .......................... 363/21.07 |

FOREIGN PATENT DOCUMENTS

| DE | 93 00 863 | 3/1993 |
| DE | 196 31 356 | 2/1998 |
| EP | 0 241 279 | 10/1987 |
| GB | 2 206 982 | 1/1989 |

OTHER PUBLICATIONS

IBM Technical Disclosure Bulletin vol. 25, No. 2, Jul. 1982, pp. 565 and 566, "Isolated Feedback for Switching Regulator", See especially 10, 19 and 12 in the Figure on p. 565.

* cited by examiner

*Primary Examiner*—Matthew V. Nguyen
(74) *Attorney, Agent, or Firm*—Young & Thompson

(57) ABSTRACT

An isolating power supply for electrical equipment comprises a transformer having an input for a mains alternating current (AC) power supply, a rectifier by which the output of the transformer can be rectified, and a primary energy storage device for electrically smoothing the output of the rectifier. A switching device is provided which is electrically connected to the output of the primary energy storage device and which can be switched between a conducting state and a non-conducting state, and a secondary energy storage device is also provided which is electrically connected to the switching device. In use, when the switching device is in a non-conducting state, the primary energy storage device stores the output from the rectifier and the secondary energy storage device is electrically isolated from the primary energy storage device and supplies an electrical output to associated electrical equipment. When the switching device is a conducting state, the primary and secondary energy storage devices are electrically connected and the secondary energy storage device stores the output from the primary energy storage device. Preferably, the switching device is a power MOSFET switching device.

14 Claims, 3 Drawing Sheets

ISOLATING POWER SUPPLY

INTRODUCTION

This invention relates to an isolating power supply for electrical equipment.

Over recent years, as the resolution and accuracy of high performance audio and sound equipment has improved, it has become clear that the quality and accuracy of sound reproduction can be dependant on, and adversely effected by, the quality of the incoming power supply to the equipment.

This degradation is due to several factors including unwanted noise superimposed on the power supply by loads with poor power factor, connection to loads which contaminate the supply with radio frequency interference (R.F.I.), and the pickup of R.F.I. and other interference by cabling feeding the equipment.

To counter this problem many manufacturers now offer costly mains conditioning units, mains filters and specialist low inductance noise cancelling cables for connection between the incoming supply and the equipment.

However, while reducing mains pollution these products can have an adverse effect on sound as a result of increasing the supply impedance or increasing capacitive or inductive loading across or in series with the electrical equipment, hereinafter referred to as the 'load'.

The present invention seeks to overcome this problem.

SUMMARY OF THE INVENTION

According to the present invention, there is provided an isolating power supply for electrical equipment, comprising a transformer having an input for a mains alternating current (AC) power supply, a rectifier by which the output of the transformer can be rectified, a primary energy storage device for electrically smoothing the output of the rectifier, a switching device which is electrically connected to the output of the primary energy storage device and which can be switched between a conducting state and a non-conducting state, and a secondary energy storage device which is electrically connected to the switching device, and means for producing a switching device control signal so that in use when the switching device is in a non-conducting state the primary energy storage device stores the output from the rectifier and the secondary energy storage device is electrically isolated from the primary energy storage device and supplies an electrical output to associated electrical equipment, and when the rectifier is no longer charging the primary energy storage device the switching device is in a conducting state so that the primary and secondary energy storage devices are electrically connected and the secondary energy storage device stores the output from the primary energy storage device.

The present invention will now be described, by way of example, with reference to the accompanying drawings.

DESCRIPTION OF THE PREFERRED EMBODIMENTS

Figure 1:
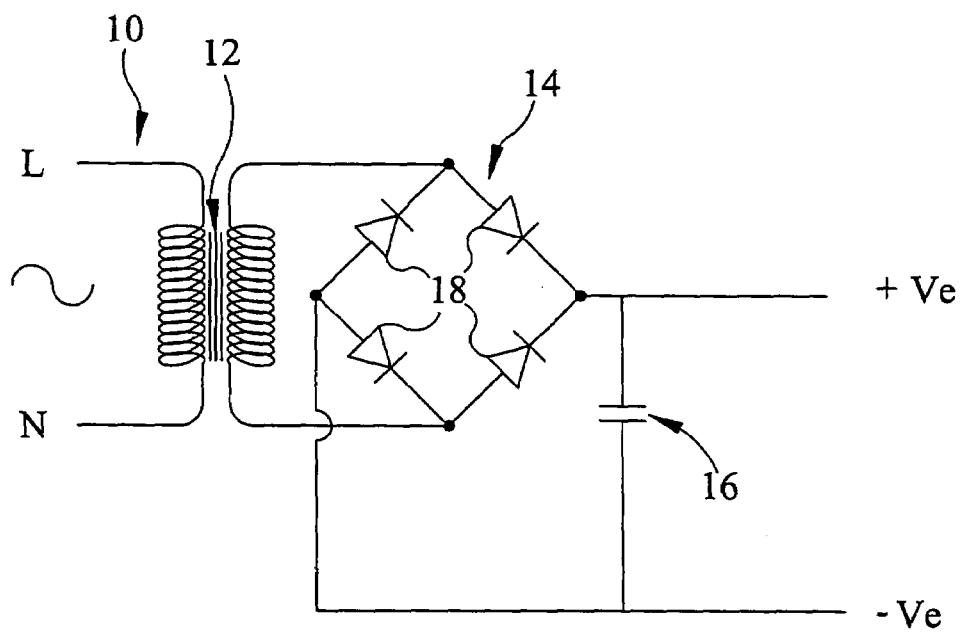
FIG. 1 is a circuit diagram of a conventional prior art power supply for electrical equipment.

Referring firstly to FIG. 1 of the drawings, there is shown a circuit diagram of a conventional direct-current (DC) power supply, such as is used in most compact-disk (CD) players, Pre-Amplifiers, and Power Amps.

The incoming mains voltage 10 is reduced to a suitable voltage via a conventional transformer 12, and the output from this is fed to a, typically bridge, rectifier 14. The output of the bridge rectifier 14 is smoothed using large electrolytic capacitors 16 (only one shown).

In use, as the alternating-current (AC) voltage output from the transformer 12 rises sinusoidally above the output rail voltage of the supply 10, the diodes 18 in the bridge rectifier 14 conduct to charge the smoothing or reservoir capacitors 16.

The transformer output voltage then drops below the rail voltage, and the diodes 18 in the bridge rectifier 14 stop conducting.

At this point the load is fed exclusively by the smoothing capacitors 16, the voltage of which drops as power is drawn prior to the next recharging cycle. As the AC voltage output from the transformer 12 rises again above the output rail voltage of the supply, the diodes 18 in the bridge rectifier 14 conduct to recharge the smoothing capacitors 16.

This discharge/recharge cycle produces voltage variation or ripple on the supply rails.

To overcome this, an integrated circuit or monolithic-type active voltage regulator (not shown) is typically used at the output to reduce ripple and noise whilst reducing source impedance. For best results two regulators will be used to give two stage regulation, for example, from a rail voltage of 27V regulated down to 18V then to 12V. This gives up to 80 db rejection of ripple and noise.

In addition to this, separate power supplies may be used to feed the individual channels of, say, a pre-amplifier to improve isolation and reduce crosstalk between left and right hand channels.

This technique is also commonly used in equipment using both digital and analogue circuits, for example, CD players, to provide isolation between digital and analogue circuits for improved performance.

Figure 2:
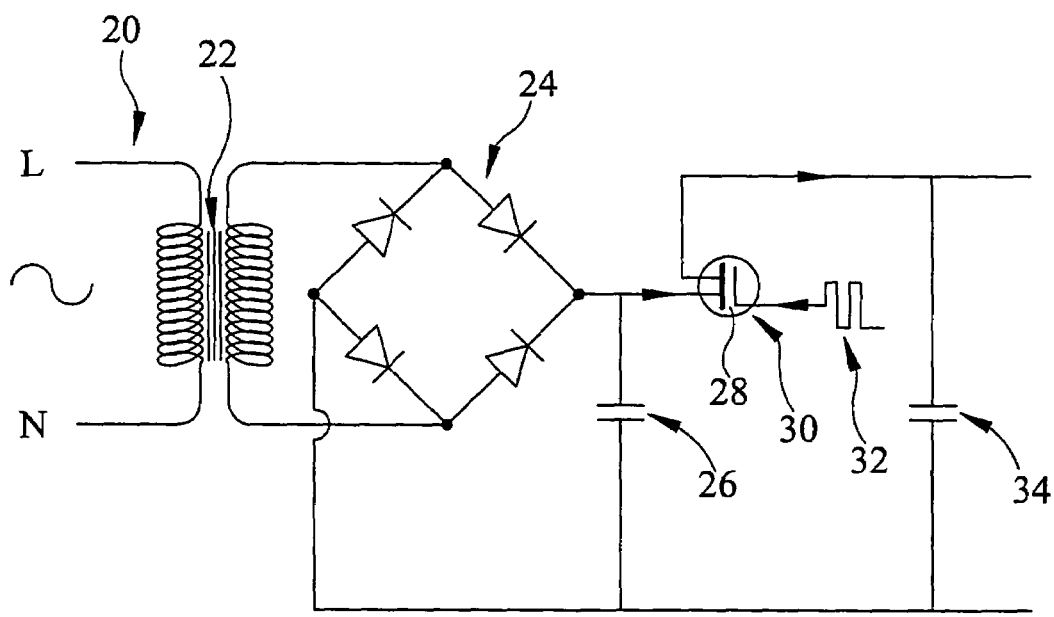
FIG. 2 is a circuit diagram of a one embodiment of an isolating power supply, in accordance with the present invention.

Referring now to FIG. 2, there is shown a circuit diagram of a first embodiment of an isolating power supply, in accordance with the present invention.

Incoming mains AC power 20 is stepped down in voltage using a transformer 22. The output of the transformer 22 is then rectified using a, typically bridge, rectifier 24 and smoothed using one or more conventional electrolytic-type primary capacitors 26 (only one shown), as per the normal type supply.

The output of the or each primary capacitor 26 is connected to a power metal oxide semiconductor field-effect transistor (MOSFET) 28, or other semiconductor, which can act as a fast switch device 30. This power MOSFET switching device 30 is controlled by a control signal 32 exhibiting a square waveform which is, in this example, 180° out of phase with the mains AC signal. The mark space ratio of the square wave control signal is set to give, in use, the required switching pattern. The MOSFET switching device 30 may be coupled to this control signal 32 using an opto-isolator (not shown) to give total isolation from the incoming mains supply 20.

The output from the MOSFET switching device 30 is connected to one or more secondary electrolytic capacitors 34, which is/are connected across the rails feeding the load.

In use, the MOSFET switching device 30 is turned OFF while the or each primary capacitor 26 is being recharged from the incoming mains supply 20 so that no conduction occurs between the primary and secondary capacitors 26 and 34. Once recharging is complete, and the bridge rectifier 24 has stopped conducting power from the incoming supply 20, the square waveform of the control signal 32 goes HIGH, turning the MOSFET switching device 30 ON, and thus allowing the or each primary capacitor 26 to recharge the or each secondary capacitor 34.

When this is complete, the control signal 32 goes LOW and the MOSFET switching device 30 is turned OFF again prior to recharging of the or each primary capacitor 26 from the incoming mains supply 20.

Figure 3:
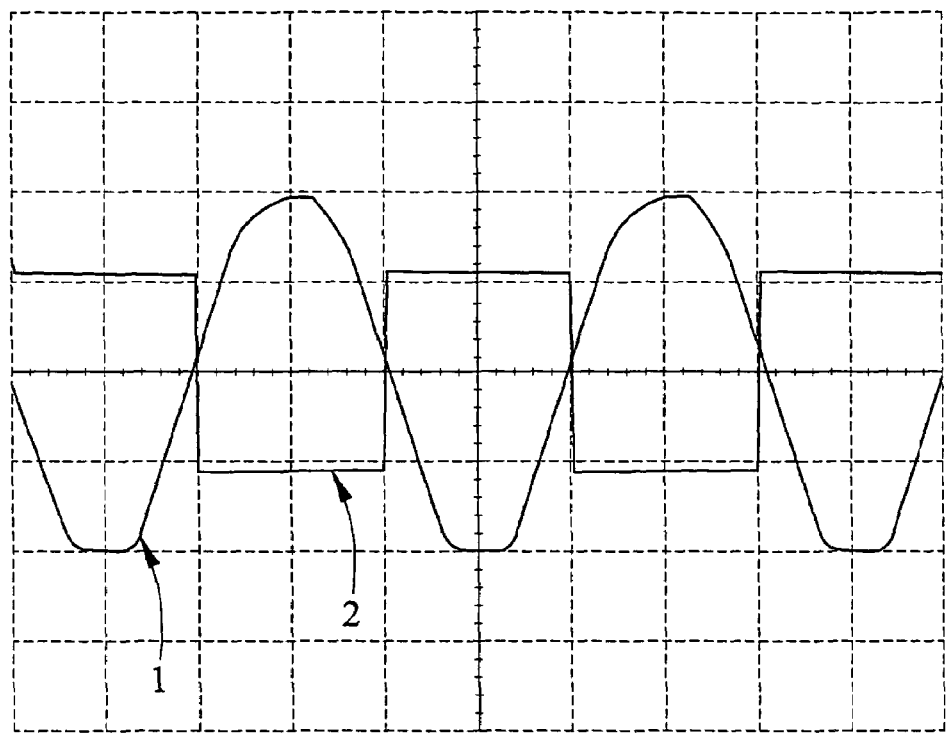
FIG. 3 shows graphs traced on a dual-channel oscilloscope when connected to the isolating power supply.

Looking in more detail at the operation of the circuit, FIG. 3 shows the print out from a dual channel oscilloscope.

This shows a sinusoidal trace 1 of the incoming supply 20 to the bridge rectifier 24, and trace 2 shows the square wave signal, used to control the MOSFET switching device 30 on the positive power rail, which is 180 degrees out of phase with the incoming mains AC supply 20.

When the incoming AC supply 20 is HIGH, and charging of the or each primary capacitor 26 occurs, the MOSFET switching device 30 is LOW and the secondary capacitor 34 is completely electrically isolated from the primary capacitor 26. When the AC supply 20 goes LOW and charging of the or each primary capacitor 26 no longer occurs, the control signal 32 goes HIGH causing the MOSFET switching device 30 to go HIGH, so that conduction and thus recharging of the or each secondary capacitor 34 from the or each primary capacitor 26 occurs.

FIG. 4 is again a print out from a dual channel oscilloscope. Trace B shows voltage variation on the or each primary capacitor 26, whilst trace C shows the voltage variation on the or each secondary capacitor 34.

At point D, the bridge rectifier 24 starts conducting and the voltage of the or each primary capacitor 26 increases. At point E, the bridge rectifier 24 stops conducting and the voltage of the or each primary capacitor 26 falls slightly to point F. At point G the MOSFET switching device 30 starts to conduct, causing the voltage of the or each primary capacitor 26 to fall whilst the voltage of the or each secondary capacitor 34 rises to point H. The primary and secondary capacitors 26 and 34 then work in parallel to feed the load with a slow fall in voltage until point I just before the or each primary capacitor 26 starts to recharge. At this point, the MOSFET switching device 30 turns OFF prior to the cycle repeating.

Figure 4:
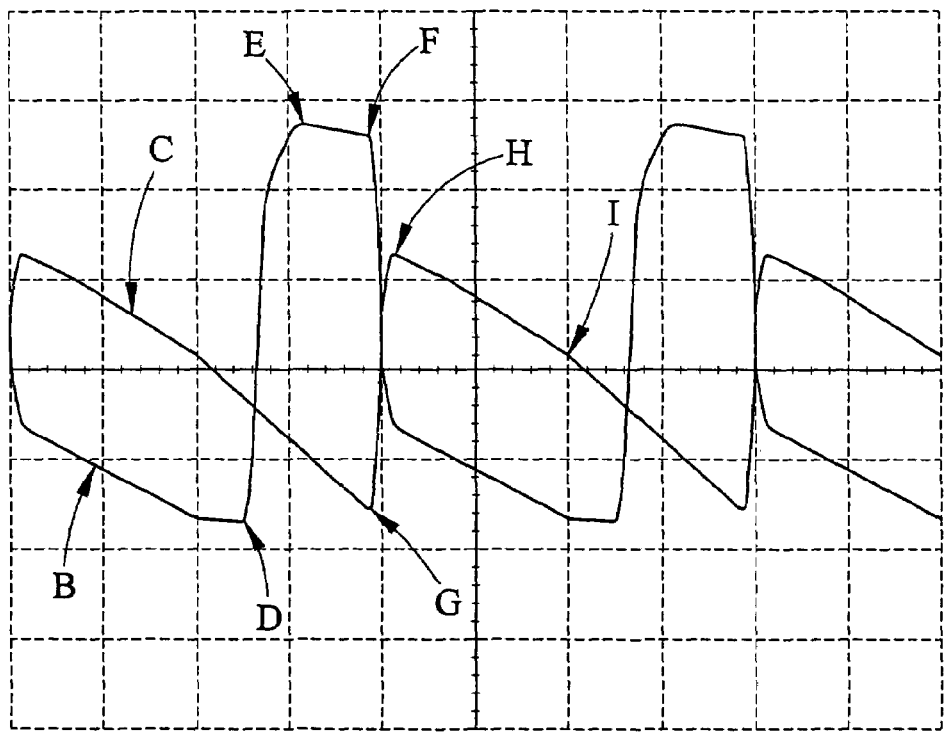
FIG. 4 shows further graphs traced on the dual-channel oscilloscope when connected to the isolating power supply.

Note, in FIG. 4, low value capacitors have been used to magnify and show clearly the switching sequence.

Figure 5:
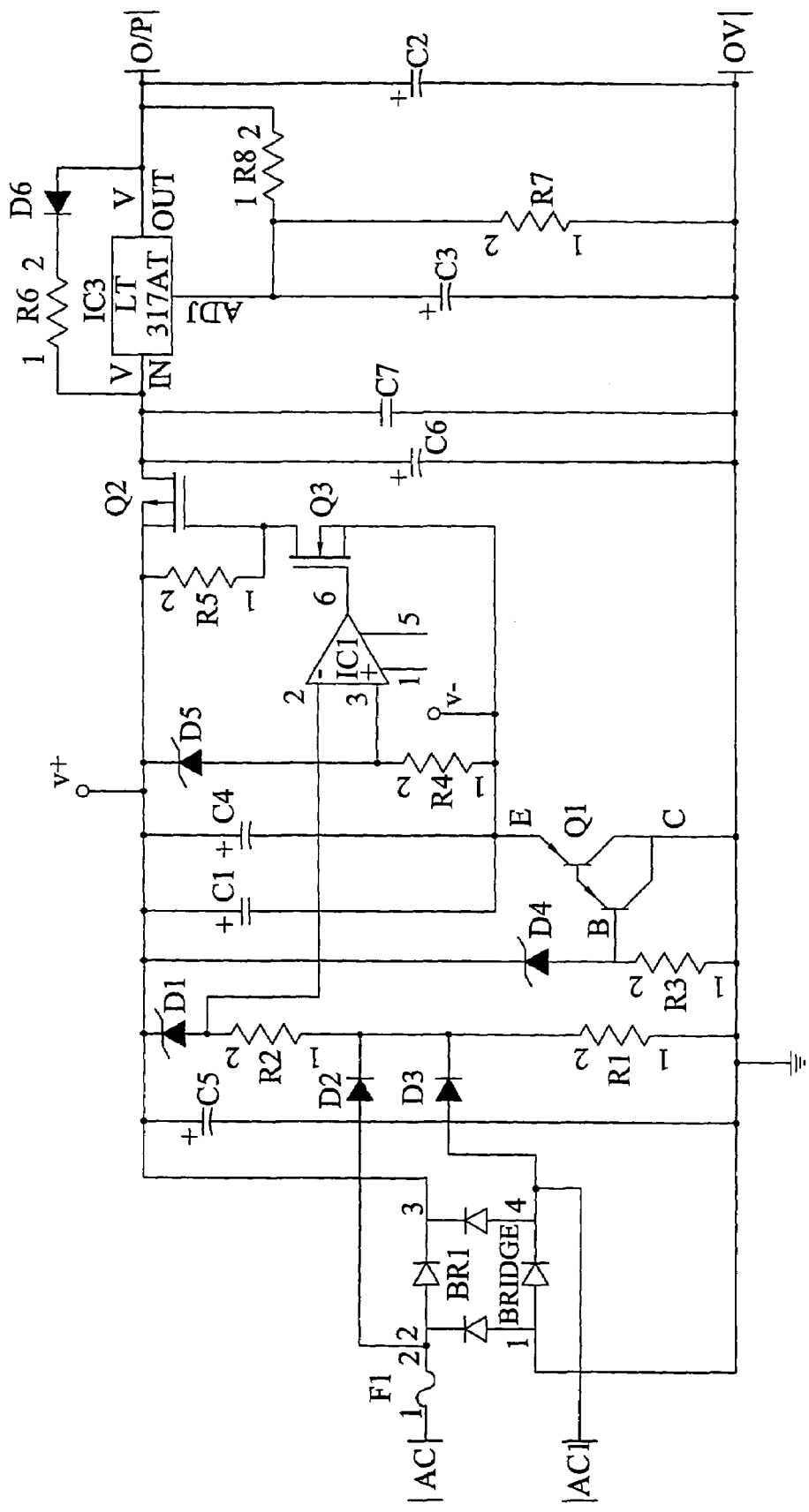
FIG. 5 is a detailed circuit diagram of an isolating power supply developed to give a 12V DC supply.

The same principles can be used to make a dual rail supply. In this case, a MOSFET switching device is used on both supply rails and controlled by square wave switching 180° out of phase with the relevant positive or negative part of the AC supply. FIG. 5 shows a detailed circuit diagram of an isolating power supply developed to give a 12V DC supply.

It should be understood that, although the semiconductor switching device has been described as only operating between an ON and an OFF state, its conduction could vary sinusoidally, or in any other suitable manner, over a range between a conducting state and a non-conducting state, as long as the variation is out of phase with the incoming AC mains supply, so that conduction between the primary capacitor and the secondary capacitor does not occur while the primary capacitor is being recharged.

As well as providing isolation from the mains power supply, the circuit design can also be used to provide total isolation between circuits. This can be achieved using two supplies fed from a single transformer.

It is possible to use other energy storage devices to store the energy in place of electrolytic capacitors. For example, inductors could be utilised.

In addition to a power MOSFET switching device, or other semiconductor switching device, any other suitable switching device which can provide total isolation of the secondary energy storage device from the incoming mains power supply could be used.

It is thus possible to provide total isolation from a contaminated incoming mains supply, and to provide isolation between circuits, by the inclusion of a switching system and one or more additional energy storage devices. Sound quality and reproduction can thus be maintained without the necessary requirement of costly mains conditioning units, filters and specialist noise cancelling cables and the disadvantages associated therewith.

The above isolating power supply can also be incorporated within the output section of switched mode type power supplies where it operates in the same way but serves to provide isolation from the high frequency interference generally produced on the output of this type of supply.

The embodiments described above are given by way of examples only, and various modifications will be apparent to persons skilled in the art without departing from the scope of the invention as defined by the appended claims.

What is claimed is:

1. An isolating power supply for electrical equipment, comprising a transformer having an input for a mains alternating current (AC) power supply, a rectifier by which the output of the transformer can be rectified, a primary energy storage device for electrically smoothing the output of the rectifier, a switching device which is electrically connected to the output of the primary energy storage device and which can be switched between a conducting state and a non-conducting state, and a secondary energy storage device which is electrically connected to the switching device, and means for producing a switching device control signal so that in use when the switching device is in a non-conducting state the primary energy storage device stores the output from the rectifier and the secondary energy storage device is electrically isolated from the primary energy storage device and supplies an electrical output to associated electrical equipment, and when the rectifier is no longer charging the primary energy storage device the switching device is in a conducting state so that the primary and secondary energy storage devices are electrically connected and the secondary energy storage device stores the output from the primary energy storage device, and the associated electrical equipment is supplied with an electrical output.

2. An isolating power supply as claimed in claim 1, wherein the switching device is a semiconductor switching device.

3. An isolating power supply as claimed in claim 2, wherein the semiconductor switching device is electrically connected to the control signal via an opto-isolator.

4. An isolating power supply as claimed in claim 1, wherein the control signal is 180° out of phase with the mains AC power supply.

5. An isolating power supply as claimed in claim 1, wherein the control signal has a square waveform.

6. An isolating power supply as claimed in claim 2, wherein the switching device is a metal oxide semiconductor field-effect transistor (MOSFET).

7. An isolating power supply as claimed in claim 1, wherein the primary energy storage device is a capacitor.

8. An isolating power supply as claimed in claim 1, wherein the primary energy storage device is an inductor.

9. An isolating power supply as claimed in claim 1, wherein the secondary energy storage device is a capacitor.

10. An isolating power supply as claimed in claim 1, wherein the secondary energy storage device is an inductor.

11. An isolating power supply as claimed in claim 1, wherein a plurality of primary energy storage devices are provided.

12. An isolating power supply as claimed in claim 1, wherein a plurality of secondary energy storage devices are provided.

13. An isolating power supply as claimed in claim 1, wherein the rectifier is a bridge rectifier.

14. An isolating power supply for electrical equipment, comprising:
   a transformer that is adapted to receive a mains alternating current (AC);
   a rectifier that is connected to and rectifies an output from said transformer;
   a primary energy storage device that is connected to and electrically smooths an output from said rectifier;
   a switching device that is electrically connected to an output from said primary energy storage device;
   a secondary energy storage device that is electrically connected to said switching device; and
   means for producing a switching device control signal that switches said switching device between a conducting state when said rectifier is not charging said primary energy storage device and a non-conducting state when said rectifier is charging said primary energy storage device,
   wherein said switching device is arranged so that when said switching device is in the non-conducting state said secondary energy storage device is electrically isolated from said primary energy storage device and said secondary energy storage device supplies an electrical output to the electrical equipment, and so that when said switching device is in the conducting state said primary energy storage device charges said secondary energy storage device and said primary and secondary storage devices together supply an electrical output to the electrical equipment.

* * * * *